United States Patent

Moore

[15] 3,661,489
[45] May 9, 1972

[54] APPARATUS FOR FORMING CONTAINERS BY MOLDING

[72] Inventor: Lawrence A. Moore, King of Prussia, Pa.
[73] Assignee: Beloit Corporation, Beloit, Wis.
[22] Filed: July 7, 1970
[21] Appl. No.: 52,812

[52] U.S. Cl. ..........................425/233, 425/305, 425/116, 425/326, 425/388, 425/395, 425/397, 425/174
[51] Int. Cl. ........................................B29c 3/00, B29d 23/03
[58] Field of Search .....................18/4 C, 4 P, 4 S, 4 V, 4 R, 18/5 BH, 5 BT, 20 B, 20 H, 19 F

[56] References Cited

UNITED STATES PATENTS

| | | | |
|---|---|---|---|
| 2,790,206 | 4/1957 | Cofek | 18/4 C X |
| 3,072,959 | 1/1963 | Leeds et al. | 18/4 P |
| 3,256,565 | 6/1966 | Alesi et al. | 18/19 F |
| 3,339,230 | 9/1967 | Farrell | 18/5 BH |
| 3,415,915 | 12/1968 | Lecluyse et al. | 18/4 R X |
| 3,449,792 | 6/1969 | Plummer | 18/5 BH |
| 3,475,521 | 10/1969 | Stroop | 18/19 F X |
| 3,517,415 | 6/1970 | McGrath et al. | 18/19 F |

FOREIGN PATENTS OR APPLICATIONS

| | | | |
|---|---|---|---|
| 940,957 | 11/1963 | Great Britain | 18/5 BT |

Primary Examiner—J. Howard Flint, Jr.
Attorney—Larson and Taylor

[57] ABSTRACT

Preforms preferably of a suitable plastic material, are heated and then placed into a container mold where they are formed into containers. The applicable heating oven depends on the shape of the preform when it is heated. A rotary oven with an outwardly spiralling path may be used for flat or partially preshaped preforms. An elongated oven may be used for heating an elongated strip, from which flat preforms are cut after heating. The container mold assembly is constituted by a plurality of individual molds, all rotatable together about an axis of the container mold assembly, the individual molds arriving successively at a loading station for receiving heated preforms.

12 Claims, 15 Drawing Figures

INVENTOR
LAWRENCE A. MOORE
BY *Larson, Taylor and Hinds*
ATTORNEYS

PATENTED MAY 9 1972  3,661,489

INVENTOR
LAWRENCE A. MOORE

BY Larson, Taylor and Hinds

ATTORNEYS

INVENTOR
LAWRENCE A. MOORE

BY Larson, Taylor and Hinds

ATTORNEYS

INVENTOR
LAWRENCE A. MOORE

APPARATUS FOR FORMING CONTAINERS BY MOLDING

BACKGROUND OF THE INVENTION

This invention relates to apparatus for heating and transferring preforms to a molding device for producing containers.

It is known to produce containers by the blow-molding A preformed material is mounted in a container mold, while in a heated condition and then formed therein into the shape of a container. Preforms can take various shapes including, for example, discs, elongated tubes (known as parisons) or partially preshaped preforms.

Of special interest is the formation of such containers from a "plastic" material such as polypropylene or the like. While forming containers from such materials, the preform is first formed by a suitable technique such as extrusion or injection molding. For example, the disc-shaped preforms would normally be cut from an extruded cylinder or punched from an extruded sheet; the tubular parisons would normally be cut from an extruded tube; and the partially preshaped preforms could be made by injection molding.

The preform must be in a heated state when it reaches the container mold. Therefore, in some cases it is desirable to simply take the preform, while still hot from extrusion or injection molding, and place it directly into the container mold. However, in other cases a cooling step must follow injection molding or extrusion in order to impart necessary structural characteristics to the preform. In this case, a means must be provided, in conjunction with the container mold, for heating the preform just before it is delivered to the container mold.

Many different methods and apparatus are known for converting preforms into containers. However, to be commercially successful, a method and apparatus must be as efficient and economical as possible, thereby reducing the cost per container to as low a level as possible. In view of this, there is a continuing need for new, improved and more efficient, and hence more economical methods and apparatus for treating preforms and molding them into containers.

SUMMARY OF THE INVENTION

Thus, it is a purpose of this invention to provide a new and improved apparatus for forming containers.

This purpose of the invention is accomplished by providing a new and improved arrangement for preform heating and container forming such that overall operating efficiency is improved.

One form of container for which the present invention is intended is that commonly known as a wide mouth jar, that is a wide cylindrical jar having an open top which is subsequently closed by a circular lid having an outer diameter which is approximately as large as the diameter of the jar itself. It is possible to form such wide mouth jars from parisons, discs or preshaped preforms. However, in certain applications, such as when it is desired to place threads on the open end of the jar, it is preferable to start with a "disc" or a preshaped preform. For simplicity, the specification will describe only the method and apparatus for handling a disc-shaped preform. However, the term "disc" is defined as any flat preform from which a disc is ultimately taken to form the container. The "disc" may be square or have any other peripheral shape during the heating step and while being fed to the container mold. It is not until the formation of the jar in the mold that the circular disc is actually pushed out of the heated flat preform. However, as will be explained in greater detail below, the invention is also applicable to the said other preforms, that is the parison and the preshaped preform.

According to one feature of the present invention, there is provided a new and improved oven for heating disc preforms. The oven includes a rotating table which resembles and rotates in a manner similar to the turntable of a record player. Mounted above this turntable is a covering which completely encloses the turntable and is spaced above it. Extending downwardly, and fixed to this cover is a spiral cage which, in plan view, forms a spiral path from a first point located half way between the axis of the turntable and the outer periphery thereof and extending to the outer periphery of the turntable. This spiral cage extends downwardly such that its lower edge is spaced above the surface of the rotating turntable a distance less than the thickness of the discs. Discs are loaded into a hopper and then fed to a point on the turntable just at the inner end of the spiral path. Rotation of the turntable, coupled by engagement of the discs with the spiral frame, moves the discs through the spiral path. Meanwhile, suitable heating elements within the oven heat the discs to the proper container forming temperature. Preferably, the discs will be heated by contact heating from below and both quartz infra-red radiant heating and conventional electrical heating from above.

At the outer periphery of the oven, a suitable transfer means is provided for transferring heated discs under controlled temperature conditions to the container mold.

According to another feature of the invention, a means is provided for feeding to the container mold an endless strip of container material from which preforms are made. The strip, which would preferably be in the form of an elongated sheet, would be heated as it passed through an elongated generally rectangular oven. At the end of the oven, a punching means would be provided for punching out discs. These discs would then be transferred to the molding station while the scrap material of the strip would be collected for subsequent use.

A feature of this disclosure is a new and improved container mold. In a preferred arrangement, this container mold includes a rotatable frame having a plurality of individual molds located about an axis of rotation of the frame. Each individual mold includes a pair of mold halves which are closable onto each other in a plane passing generally through the said axis. Each pair of mold halves includes a set of clamping arms extending outwardly from a pivot point on the said plane, one arm connected to each mold half. Means are provided for moving the clamping arms towards and away from each other to close and open the mold, respectively, and further means are provided for rotating all of the said individual molds of the frame in unison about said axis. In one preferred arrangement, six individual molds are provided. In a preferred embodiment of the invention, the molds open at a given station. This would be the loading station whereat the molds would receive a preform for forming a new container.

For purposes of simplicity, this specification will describe the rotary mold assembly with respect to a disc preform. However, it will be apparent that this rotary mold assembly is equally adaptable for use with a partially preshaped (injection molded) preform, a tubular parison preform or other preforms.

Thus, it is an object of this invention to provide a new and improved apparatus for forming containers.

It is another object of this invention to provide a new and improved apparatus including a circular oven having a spiral shaped path for heating disc preforms before introducing the same into a molding apparatus.

It is another object of this invention to provide a new and improved means for heating a strip of preform material before cutting out flat disc preforms and feeding the latter to a molding apparatus for forming the preforms into containers therein.

It is another object of this invention to provide a new and improved apparatus for heating preshaped preforms and forming the same into containers by molding.

Is is another object of this invention to provide a new and improved molding apparatus wherein previously cooled preforms are efficiently and economically heated, delivered to the molding apparatus and formed into containers therein.

Other objects and the intended advantages of the present invention will become apparent from the detailed description to follow, together with the accompanying drawings.

BRIEF SUMMARY OF THE DRAWINGS

There follows a detailed description of the preferred embodiments of the invention to be read together with the accompanying drawings.

DETAILED DESCRIPTION OF THE PREFERRED EMBODIMENTS

In the detailed description which follows, like numerals are used to represent like elements throughout the several views.

Figure 1:
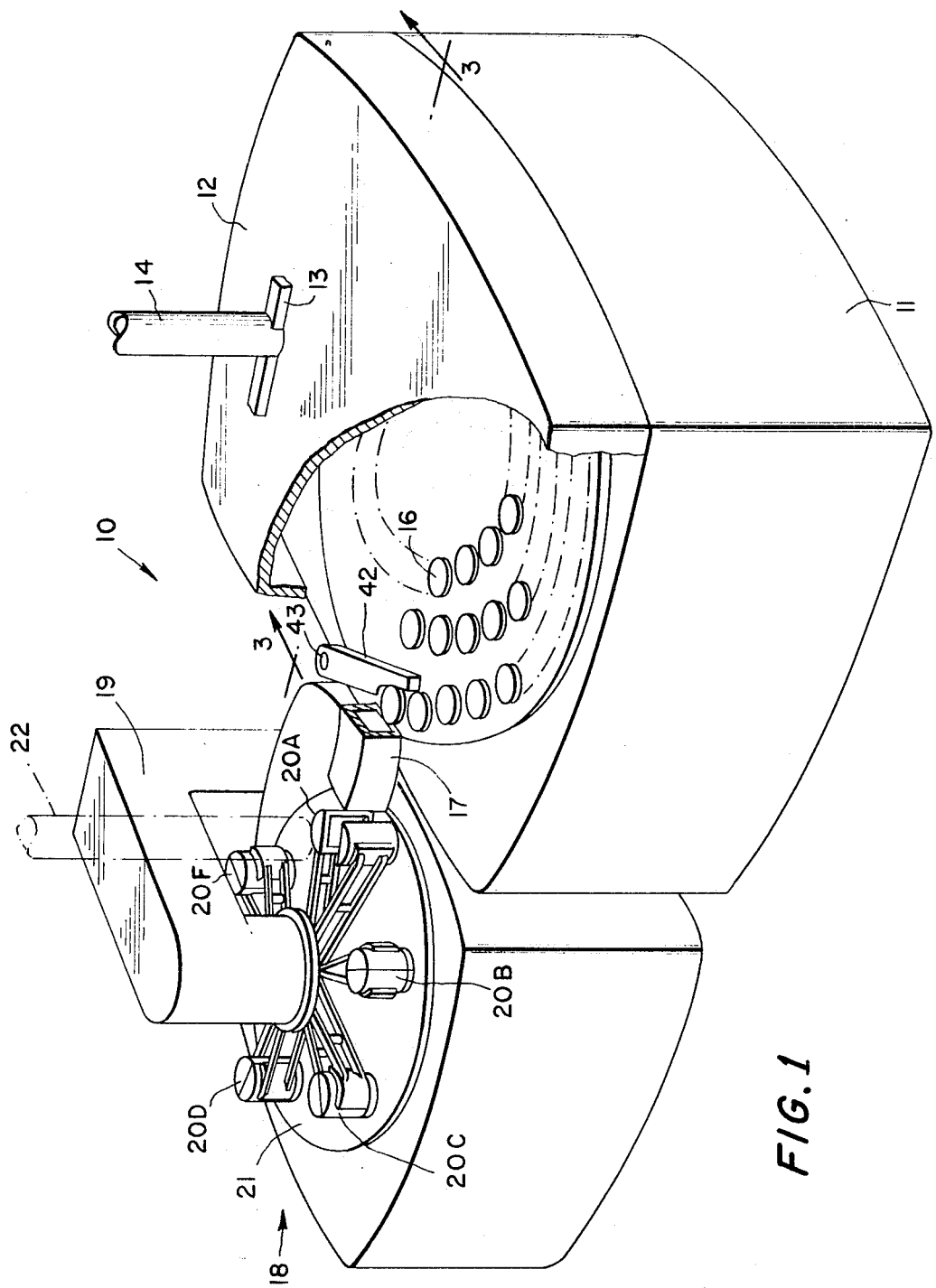
FIG. 1 is a perspective view of a first embodiment of the present invention and shows a rotating disc oven together with a rotating mold assembly.

Referring to FIG. 1, an overall preform heating and container forming apparatus 10 includes a disc preform heating oven 11 and a rotary mold assembly 18. The oven 11 includes a cover 12 which has been broken away in FIG. 1 to show a turntable 15 with disc preforms 16 thereon (the frame for imparting outward spiralling motion to the disc 16 is omitted from FIG. 1 for simplicity). Heated discs 16 pass through a transfer device 17 and into an open mold 20A of the rotary mold assembly 18. There are five other molds 20B through 20F, all of which are mounted on a turntable 21 for rotating movement in unison with each other. The details of the rotary mold assembly 18 will be explained in greater detail below.

Figure 2:
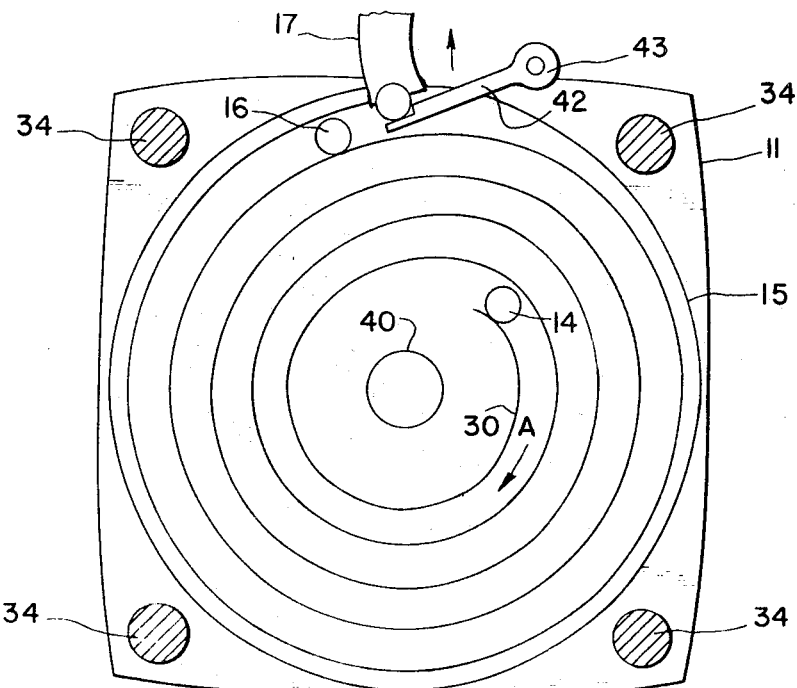
FIG. 2 is a plan view of the rotary disc oven of FIG. 1 with the cover removed for purposes of illustration.
Figure 3:
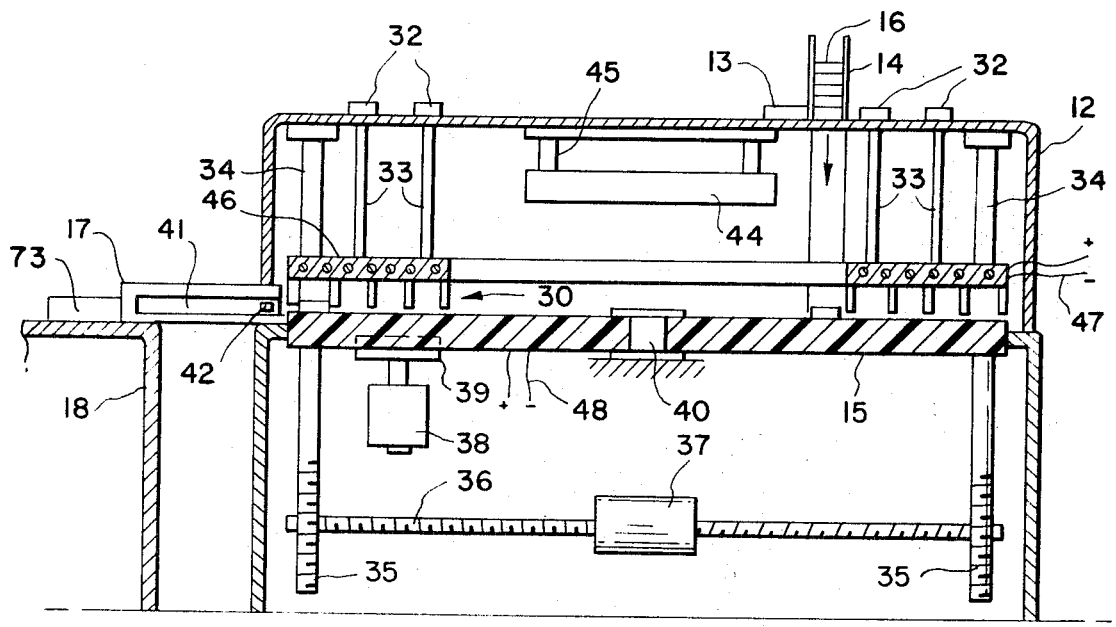
FIG. 3 is a cross-sectional view of the rotary disc oven and is taken along line 3—3 of FIG. 1.

Referring now to FIGS. 2 and 3, in addition to FIG. 1, the disc heating oven 11 includes a fixed cover member 12 having a feed hopper 14 mounted thereon. Disc preforms 16 are loaded into this hopper 14 and are dropped onto the oven turntable 15 upon movement of a gate 13. This oven turntable 15 would preferably be fabricated from cast iron or similar material and coated with a material having non-sticking characteristics such as Teflon. Referring to FIGS. 2 and 3, a spiral frame 30 is fixed to an annular electrical heating member 46 which is in turn secured to the cover member 12 by means of bolts 32 and brackets 33. Four support jacks 34 located one at each corner, hold the cover member 12, including the support elements, the heating elements, and the spiral frame 30.

At its lower end, the support jacks 34 are threaded, as shown at 35. These lower ends 35 threadedly engage worm gears 36 which are operated by a motor 37. Thus, by turning the threaded worm gears 36, one raises the entire assembly including the cover 12, spiral frame 30, the heating elements and the hopper 14. In practice, it may be desirable to raise the cover member 12 perhaps 12 to 18 inches, for example when servicing the various elements in the oven.

In operation, the oven turntable 15, which is supported for rotation by bearing 40, is driven by a suitable motor such as 38, the output shaft of which includes a gear 39 which engages the outer periphery of the turntable 15. As shown in FIGS. 2 and 3, disc preforms from the hopper 14 fall onto the turntable 15 at the inner end of the spiral path formed by the frame 30. Rotation of the turntable 15 in the direction of the arrow A (see FIG. 2) will then cause the discs 14 to engage the sides of spiral frame 30 and pass along a spiral path until they reach the outer periphery of the turntable 15 at transfer device 17.

In a preferred operation of the invention, the turntable 15 would be 96 inches in diameter and adapted to heat discs having a maximum diameter of 3½ inches. Fast initial radiant heating from above would be provided in the center of the oven by quartz infra-red heaters 44. A conventional heating unit 46 in the shape of an annulus would then heat the preforms uniformly as they progressed along the spiral path. Current at 47 heats 46. Preferably, spiral frame 30 is connected to and extends down from 46. Meanwhile, current through the lines 48 would heat the turntable 15, thereby heating the disc 16 by contact from below. With this geometry, the oven would hold approximately 480 3½-inch discs. Using polypropylene, the speed of the oven would be such that each disc remained therein for 8 minutes and became heated to approximately 300°–320° F. Obviously, these dimensions and these conditions are provided only as an example and they can be varied depending upon the material used, size or shape of the preforms, the specific nature of the container molding procedure, the specific properties to be imparted to the finished container, etc.

As shown in FIG. 2, the discs 16 are dropped onto the turntable at a point intermediate the center thereof and the outer periphery. It has been found that the capacity of the oven is at a maximum if the discs are dropped at a point halfway between the center of the turntable and the outer periphery thereof.

After the discs have been heated, they reach the outer periphery of the turntable 15 and move into a transfer device 17 into the path of a transfer arm 42. This transfer arm 42 is pivotable about axis 43. This transfer device 17 would be a covered chute having a slot 41 in the side thereof for receiving the transfer arm 42. The transfer arm 42 would be moved rapidly to whip a heated disc 16 onto an awaiting open mold of the rotary mold assembly 18 as fast as possible without loss of heat.

Figure 4:
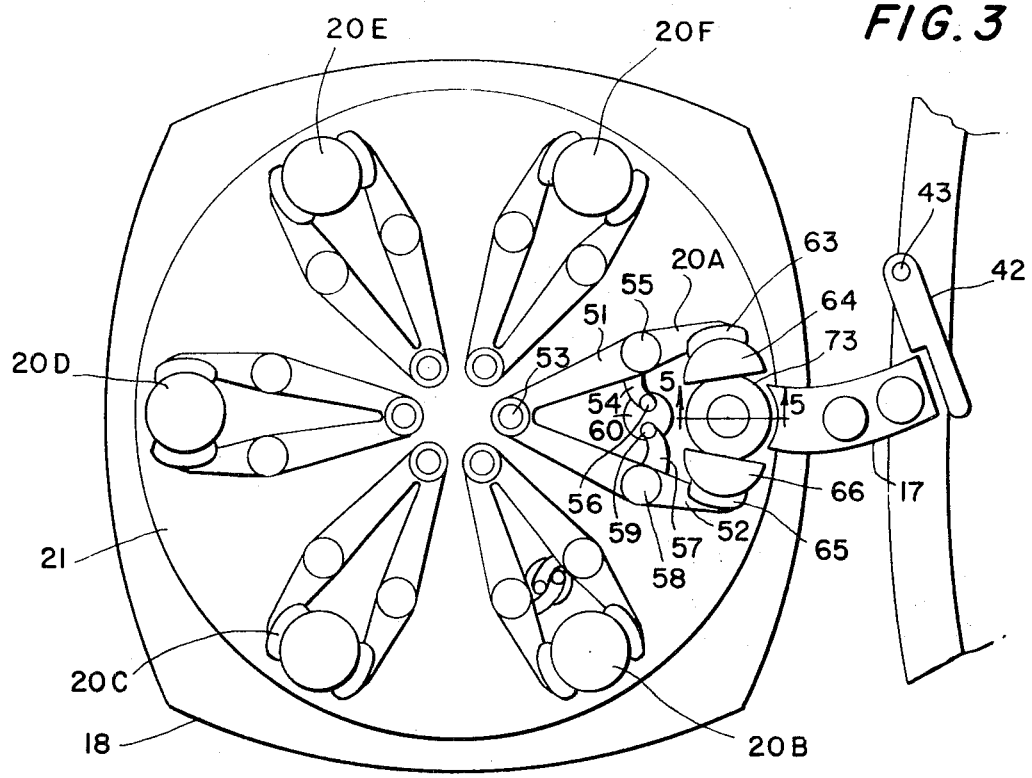
FIG. 4 is a plan view of the individual molds of the rotating mold assembly.

FIG. 4 illustrates the rotary mold assembly 18. This assembly includes six individual molds 20A through 20F. Since all of these molds are identical, only one of them, namely mold 20A will be described in detail. A sectional view of mold 20A is shown in FIG. 5A.

The six molds are fixed onto the turntable 21 and are rotatable therewith about a central axis 50. Each individual mold, for example mold 20A, comprises a pair of mold arms 51 and 52 connected together at pivot point 53. A clamp arm 54 is pivotably connected at one end to the arm 51 at pivot connection 55 and is pivotally connected at its other end 56 to a drive unit 60. Similarly, a clamp arm 57 is pivotably connected at one end 58 to the mold arm 52 and at its other end 59 to the drive unit 60. By rotating the drive unit approximately 170° about its own axis, the mold is closed. Note the positions of these elements in FIG. 4 with respect to mold 20B. The clamping elements are omitted from molds 20C through 20F for simplicity. The outer ends 63 and 65 of the mold arms 51 and 52 are adapted to receive and hold by suitable means such as bolts or the like the halves 64 and 66 of the mold itself. FIG. 5A shows the inside of the mold. Each mold has associated therewith a disc receiving mount 73, which, in addition to receiving the discs, houses the parts which hold and act on the disc to convert the same into a container.

Figure 5B:
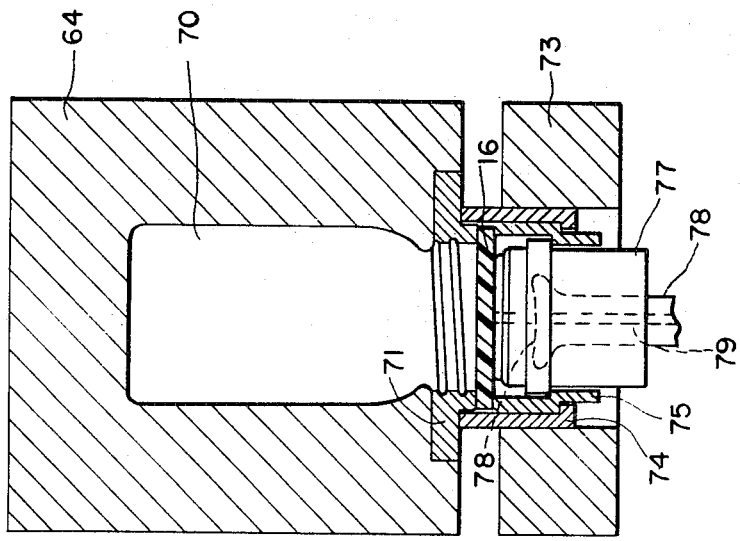
FIGS. 5A through 5E illustrate the operation of an individual mold of the rotating mold assembly.
Figure 5A:
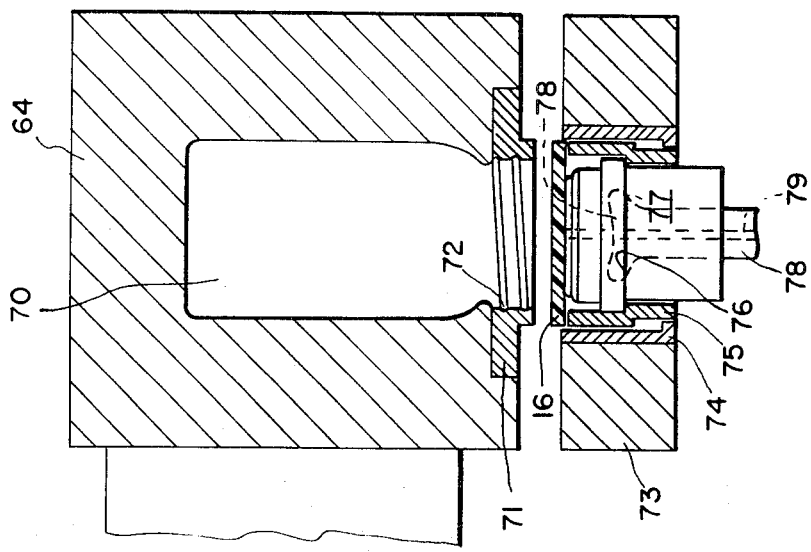

Referring to FIG. 5A, each mold half includes a cavity 70 and a thread ring 71 at the lower portion thereof. This thread ring includes thread cavity 72 formed therein. Below the mold, the mount 73 includes an outer annular positioning ring 74, and an annular clamp ring 75 located within the positioning ring 74. Within the ring 75 is a unit 77 having formed about its periphery a cut-off plug 76. Slidably mounted within the unit 77 is a stretch plug 78 which has an air flow passage 79 passing therethrough.

As the mold assembly rotates, each individual mold, such as mold 20A will receive a disc 16 at the loading position adjacent the transfer device 17. The assembly will then continue to rotate, such that each individual mold arrives at transfer device 17 in the open condition to receive a preform. After a given mold has received its disc 16 and rotated approximately 300° to 330°, the container will have been completely formed therein. The mold halves separate and the finished container is ejected upwardly through the discharge tube 22 (see FIG. 1). The mold then moves to device 17 to receive another preform.

Figure 5E:
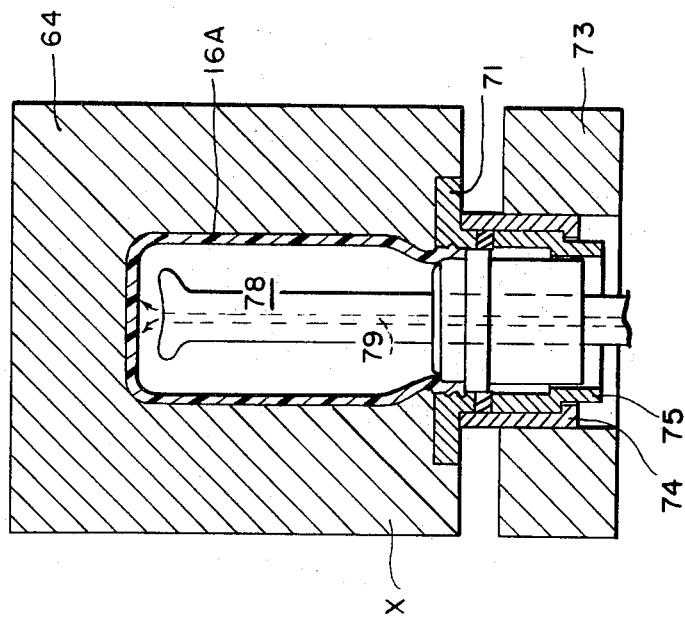
Figure 5D:
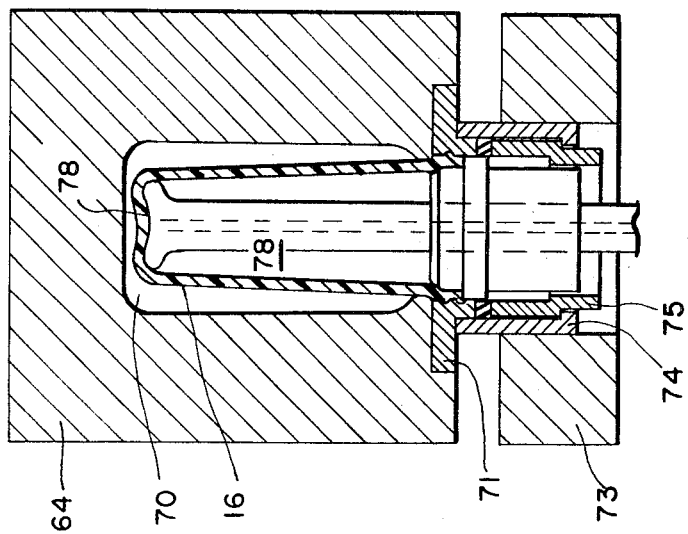
Figure 5C:
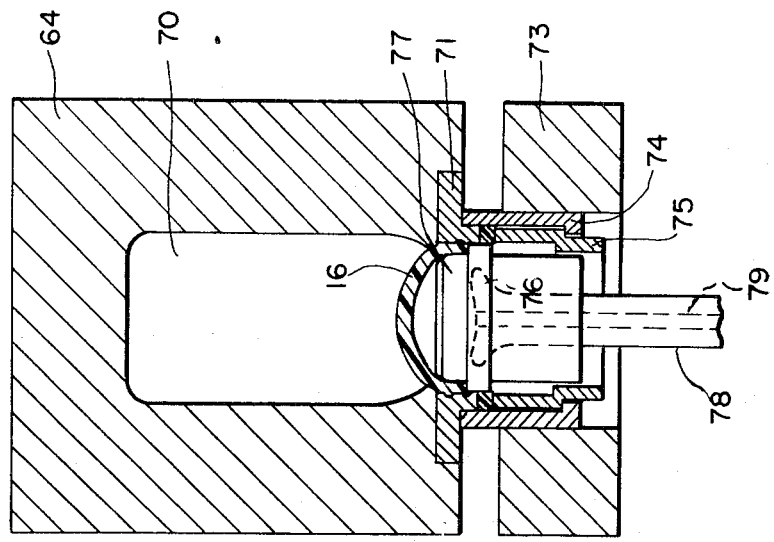

FIGS. 5A through 5E illustrate the operation of each individual mold to form a container therein. In the open position, as shown in FIG. 5A, the ring 74 is raised above the ring 75 to provide a recess for receiving the disc 16. In FIG. 5B, both the positioning ring 74 and the clamp ring 75 have moved upwardly, the ring 74 against the thread ring 71 and the clamp ring 75 against the disc 16. In FIG. 5C the unit 77 has moved upwardly. Meanwhile, the outer periphery of cut-off plug 76 shears off the inner portion of disc 16 while the upper portion of unit 77 urges the outer edge of the remaining portion of disc 16 into the thread cavity 72. Next, the stretch plug 78 moves upwardly, stretching the disc 16 to fill approximately 80 percent of the cavity 70. Finally, as shown in FIG. 5E, high pressure air is passed through the passage 79 to force the disc 16 against the outer periphery of the cavity 70. This completes the formation of the container. The mold then opens, the finished bottle is ejected, the units 77 and 78 are withdrawn to their original positions, and a new disc is delivered to the position as shown in FIG. 5A and the cycle is repeated.

Figure 6:
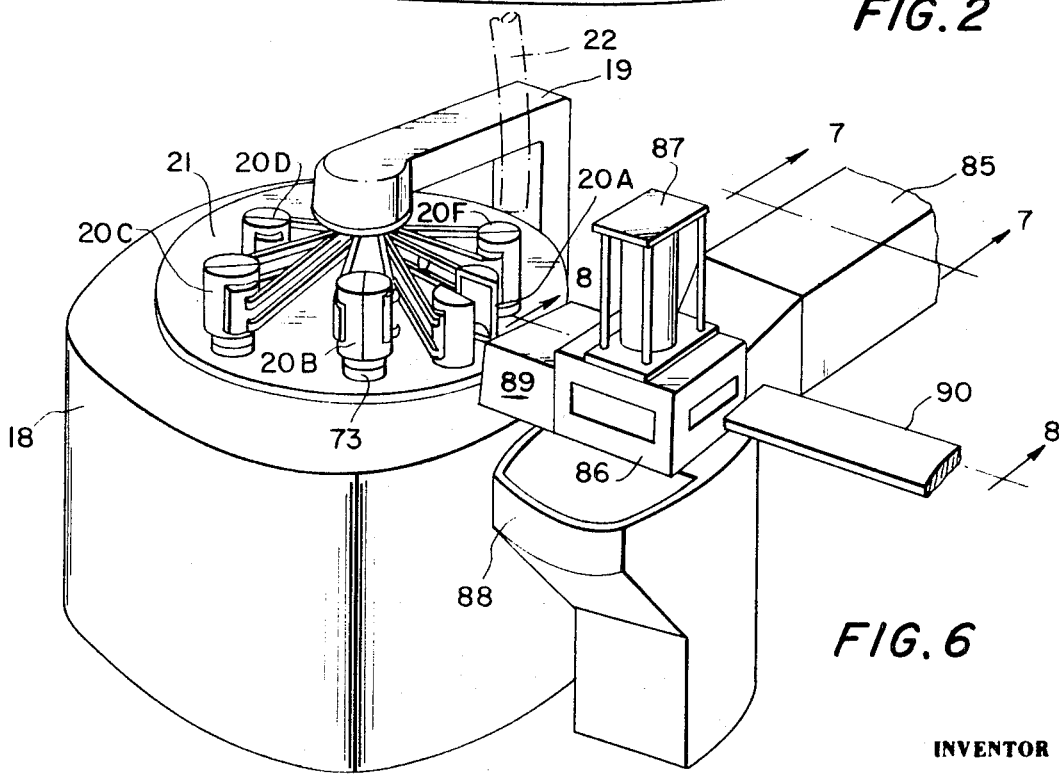
FIG. 6 illustrates a further embodiment of the invention wherein the rotating disc oven is replaced by a strip oven, the latter being shown with the same rotating mold assembly of FIGS. 1 through 5.
Figure 7:
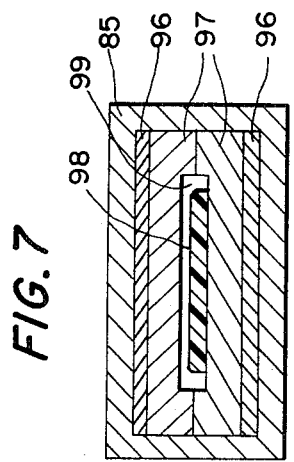
FIG. 7 is a cross-sectional view of the strip oven and is taken along line 7—7 of FIG. 6.

FIGS. 6 through 9 show another embodiment of the invention. In this embodiment, the rotary mold assembly 18 is the same, but the disc oven 11 is replaced by a unit capable of heating the preform material in strip form and then punching out discs and feeding the discs directly to the mold assembly 18. This embodiment includes a strip oven 85 for receiving and heating preform material in endless strip form. As shown in FIG. 7, this oven includes outer insulation 95 enclosing a pair of strip heating elements 96. Support for the strip 98 is provided within the strip heaters 96 by upper and lower aluminum casings 97. In a preferred arrangement, the opening 99 between the upper and lower portions 97 is one-half inch in height and 4 inches wide. The overall strip oven 85 may be 6 to 8 inches in width and approximately 3 inches in height. The oven would be 15 feet long. A sheet three-sixteenths of an inch in thickness would pass through the 15-foot oven in approximately 17 to 18 minutes and would be raised to a temperature of 320° F. Of course the inner surface of the lower element 97 would be treated so that the strip would not stick to it. The above data and the above operating conditions are provided for illustration only. It is of course apparent that the dimensions and the operating conditions would be varied depending upon the material used, the desired characteristics of the container, etc.

Figure 8:
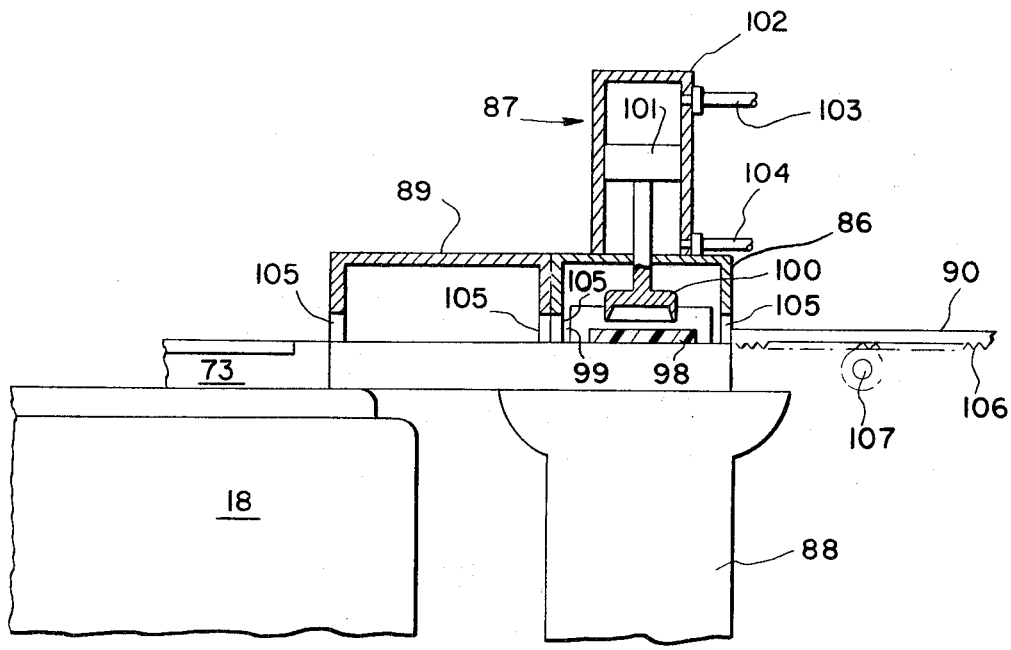
FIG. 8 is a cross-sectional view taken along line 8—8 of FIG. 6.
Figure 9:
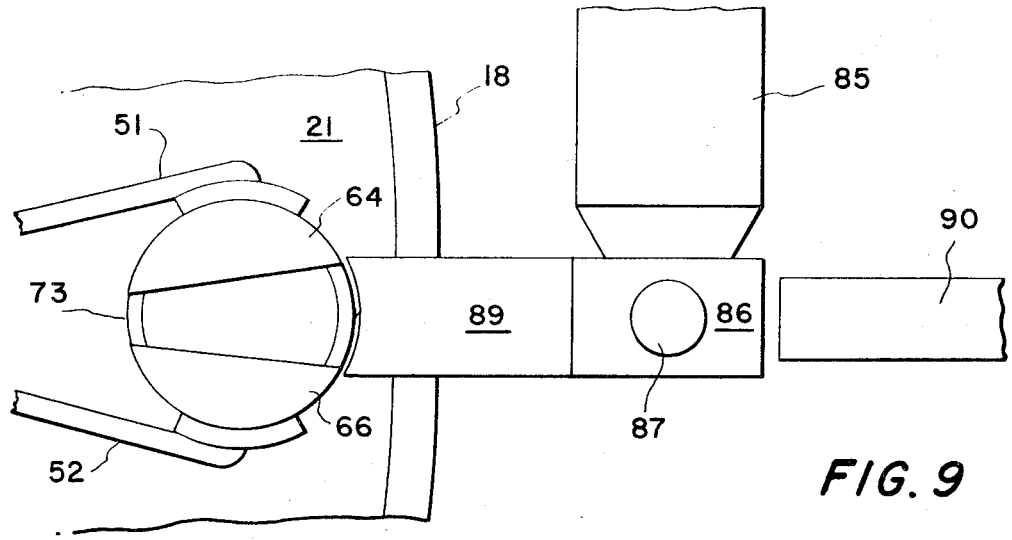
FIG. 9 is a plan view of a portion of Figure 6.

At the end of the strip oven 85, the strip passes into a punching station 86. At this point, a punch 100 of a punching unit 87 punches a disc out of the end of strip 98. As shown in FIG. 8, the unit 87 may be fluid operated. It may include a double acting piston 101 reciprocable in a cylinder 102 with fluid lines 103 and 104 leading to the upper and lower ends of the cylinder 102. After the disc has been punched out, waste strip material falls out of the unit 86 through the opening as shown in FIG. 6 into the strip scrap recepticle 88. A suitable discharge device 89 is provided between the punch unit 76 and the rotary mold assembly 18. This unit 89 serves essentially the same purpose as the transfer device 17 in the earlier embodiment in that it provides a controlled temperature passageway for the disc as the latter is delivered to the assembly 18. In the present case, aligned openings 105 are provided in both the punch unit 86 and the discharge device 89. A disc feed rod 90 having a rack 106 on the bottom thereof operated by a pinion gear 107, then moves to the left (as shown in FIGS. 8 and 9) to push the cut-out disc out of the unit 86, through the unit 89 and onto the mount 73 of the assembly 18.

Once at the unit 18, the disc is then acted on in exactly the same manner as described above with respect to the first embodiment.

Figure 10A:
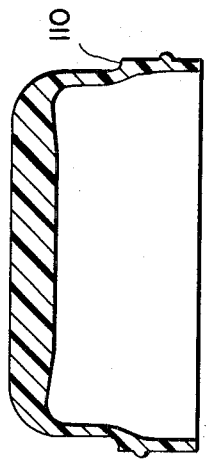
FIGS. 10A and 10B illustrate preshaped preforms.
Figure 10B:
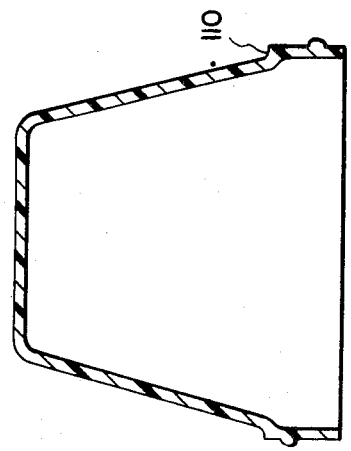

The invention has been described in detail with specific reference to a disc-shaped preform. However, as indicated earlier in this application, the invention is applicable to preforms of other shapes. For example, both the disc oven and the rotary mold assembly may be used with a partially preshaped preform as shown in FIGS. 10A and 10B rather than a disc. Such preshaped preforms have the advantage that the threaded opening, which is the most difficult part of the container to form, is already preformed in the injection mould. This greatly simplifies the subsequent molding procedure. To use such a preshaped preform, the disc heating oven would have to be modified slightly to assure uniform heating of the preshaped preforms. The cycle of operation of each individual mold would then be modified accordingly. The thread ring 71 would be replaced by a plane ring having an inwardly extending flange at its upper end for receiving the shoulder 110 of the preforms as shown in FIGS. 10A and 10B. The elements 74, 75 and 76 would no longer be necessary. The unit 77 would move upwardly to seal the opening of the preform. The element 78 would then be employed in the same way to stretch the preform so that it covered approximately 80 percent of the space within the cavity formed by the two cavity halves 70, and, as shown in FIG. 5E, air would then be delivered through the passageway 79 to complete the formation of the container within the mold.

To operate the rotary mold assembly 18, it will be necessary to deliver both hydraulic and pneumatic fluid and also electricity to each of the six individual molds 20. For example, either hydraulic, pneumatic or electrical power may be used to operate the drive unit 60 and to impart vertical motion to the elements 74, 75, 77 and 78. And of course air under pressure must be delivered to the passage 79. Pneumatic and hydraulic fluid may be delivered to a central manifold and passed from the central manifold to the respective mold station through a suitable rotary valve. Electricity can be provided through slip rings in a manner known per se.

According to another feature, a means may be provided for applying a lining to the main preform. For example, a Saran liner could be applied to a polypropylene disc to serve as an oxygen barrier. This is especially important if the container is to be used for packaging food. Such an apparatus could take the form of a press similar to the punching unit 87, except that the cutting portion 100 would be replaced by a flat press. The unit could be placed at any suitable location between the heating stage and the rotary mold assembly 18. For example, it may form a part of the transfer devices 17 or 89. In this case, as the heated disc proceeded to the rotary mold assembly 18, a barrier layer would be inserted over the disc and the press would simply come down and press the layer against the disc. Alternatively, in the embodiment of FIGS. 6 through 9, the unit 86 may be modified so that a layer of lining material is inserted onto the disc before the downward stroke of the punch 100. This downward stroke would then not only trim excess strip material but also press the lining material against the disc. Ideally, the lining material is not added until after the scrap strip material has been removed. In this situation, the scrap strip material is not contaminated by scrap lining material, and hence it may be melted and re-used. Obviously, this cannot be done if scrap lining material entered the scrap recepticle 88 along with scrap strip material.

Although the invention has been described in considerable detail with respect to preferred embodiments thereof, it will be apparent that the invention is capable of numerous modifications and variations apparent to those skilled in the art without departing from the spirit and scope of the invention.

I CLAIM:

1. An apparatus for making containers comprising: a covered oven means for receiving container preforms and heating the same to a forming temperature, said oven being arranged for continuous movement of said preforms into said oven at a first location, through the oven to heat the preforms, and out of the oven at a second location, said oven means including a rotating table, and moving means for moving preforms through the oven along an outwardly spiralling path about the center of the turntable, a transfer device, a container forming means for forming said preforms into containers, said transfer device including means for transferring said preforms from said oven means to said forming means, and said forming means including a plurality of individual molds mounted for successive register with said transfer device such that successive heated preforms passing through the transfer device enter successive ones of said molds.

2. An apparatus according to claim 1, including feed means for feeding preforms onto said turntable.

3. An apparatus according to claim 1, wherein said transfer device comprises a housing arranged to receive preforms at the outer periphery of the turntable and to provide a path to the mold, and a means for impelling the preform through the housing to the mold.

4. An apparatus according to claim 3, wherein said preforms are in the shape of generally flat discs, and wherein the feed means includes a hopper for feeding the discs into the oven at a point half-way between the center of the turntable and the outer periphery thereof.

5. An apparatus according to claim 2 including a fixed cover and wherein said moving means includes a non-rotationally mounted spiral frame extending downwardly from the cover to a level just above the turntable to provide an outwardly spiralling path, and wherein said feed means feeds the preforms to the oven at the inner end of the spiral path, whereby rotation of the turntable and engagement of the preforms with the spiral frame cause the preforms to follow an outwardly spiralling path to the outer periphery of the turntable.

6. An apparatus according to claim 5, including means for lifting and lowering the cover and the spiral frame relative to the turntable.

7. An apparatus according to claim 1, wherein said forming means comprises a rotatable frame, said plurality of individual molds are mounted on the frame for rotation about a common axis, each mold including means for holding the preforms to convert the preform into a container.

8. An apparatus according to claim 7, wherein each mold includes a pair of mold halves closable onto each other on a plane passing through the said axis, and pair of clamping arms extending outwardly from a pivot point, one arm connected to each mold half, means for moving the clamping arms toward and away from each other to close and open the mold, respectively.

9. An apparatus for making containers comprising: a covered oven means for receiving container preforms and heating the same to a forming temperature, said oven being arranged for continuous movement of said preforms into said oven at a first location, through the oven to heat the preforms, and out of the oven at a second location, a transfer device, a container forming means for forming said preforms into containers, said transfer device including means for transferring said preforms from said oven means to said forming means, said forming means including a plurality of individual molds mounted for successive resistor with said transfer device such that successive heated preforms passing through the transfer device enter successive ones of said molds, said oven being an elongated oven including an elongated passageway for receiving a strip of preform material, means at the outlet end of said oven for punching discs from said strip, and said transferring means including a rod mounted to engage said discs on a side thereof at the location at which the discs are punched and to move the discs at an angle to the direction of movement of the strip to push each punched-out disc through the transfer device to successive ones of said molds.

10. An apparatus according to claim 9, said disc punching means being a fluid operated punching device, and means for collecting the waste strip around the punched discs.

11. An apparatus according to claim 9, wherein said forming means comprises a rotatable frame, said plurality of individual molds are mounted on the frame for rotation about a common axis, each mold including means for holding the preforms to convert the preform into a container.

12. An apparatus according to claim 11, wherein each mold includes a pair of mold halves closable onto each other on a plane passing through the said axis, and a pair of clamping arms extending outwardly from a pivot point, one arm connected to each mold half, means for moving the clamping arms toward and away from each other to close and open the mold, respectively.

* * * * *